United States Patent [19]

Cope

[11] 3,972,120

[45] Aug. 3, 1976

[54] DENTAL INSTRUMENT TRAY DEVICE

[76] Inventor: Raymond Cope, 4285 Third Ave. South, P.O. Box 31053, Birmingham, Ala. 35222

[22] Filed: Feb. 28, 1975

[21] Appl. No.: 553,887

[52] U.S. Cl. .................................................... 32/22
[51] Int. Cl.$^2$ .......................................... A61C 19/02
[58] Field of Search .................. 32/22; 307/92, 150

[56] References Cited

UNITED STATES PATENTS

| | | | |
|---|---|---|---|
| 2,214,774 | 9/1940 | Pieper | 32/22 |
| 3,217,412 | 11/1965 | Pascente | 32/22 |
| 3,518,763 | 7/1970 | Weiss et al. | 32/22 |
| 3,530,513 | 9/1970 | Maurer et al. | 32/22 |

*Primary Examiner*—Robert Peshock

[57] ABSTRACT

In a preferred embodiment, a base structure affording upright support for a substantially horizontally mounted tray providing for movement of the tray slidably forwardly and backwardly intermittently optionally to desired degrees, and providing for forward and backward slant and for slant in either direction intermittently to desired degrees optionally, the tray having an upper surface defining a plurality of parallel grooves open at the forward ends thereof with the forward opening structure of at least one of the grooves defining a constriction in the groove and thereafter a forward widening thereof terminating as an abrupt step, and there being a mechanized tool of dentistry attached to a tubular connector having a forward end defining a downward projection such that the downward projection engages the step when the tubular connector is in a withdrawn state and there being an outer casing having a spiral ridge on the outer surface thereof mounted slidably over a portion of the tubular connector and defining a forward projection downwardly for engagement with the step, the width of the constriction being less than a diameter of the outer casing such that the forward end of the tubular outer casing is angled forwardly downwardly in the enlarged forward portion of the slot thereby facilitating the retained engagement of the downward projection of the outer casing with the step, such that during a dentist's use of the mechanized dental instrument the engaged projection of the outer casing with the step prevents rearward pulling pressure on the dental instrument during manual movements of and working with the dental instrument by the dentist.

8 Claims, 8 Drawing Figures

DENTAL INSTRUMENT TRAY DEVICE

This invention relates to a novel dental tray for providing special support and engagement against retraction of cord-connected mechanized dental instruments.

BACKGROUND TO THE INVENTION

Prior to the present invention, there have existed a number of unsolved problems in so far as dentist's use of conventionally available instrument mounts for mechanized dental instruments such as drills, air blowing instrument, water mouth-rinsing instrument, water-suction instrument, and the like, basically the probelm being one of hinderances to the undivided attention of the dentist to his work and one of unrestricted movement manually, together with advantageous automatic withdrawal of the connector tube or line efficiently. At the same time, the simplicity of operation and construction of the equipment has a direct bearing on the continued long term durability of the equipment in a fully efficient operational state, and also has an effect on the question of maintenance and the cost thereof. Also, not all dentists are of the same height, nor are the patients, and often dentists find it desirable to sit, while other dentists still normally prefer to stand during the caring for a dental patient; these and other variables add to the complexities and problems associated with any effort to design any dental equipment equally satisfactory for any one or more of such variables.

SUMMARY OF THE INVENTION

Accordingly, objects of the present invention include the overcoming and/or avoiding of one or more of the above problems, and in a preferred embodiment overcoming substantially all of such problems.

More particularly, the present invention includes an object to avoid the twisting of the connector tube or cord in the retracted state.

Another object is to avoid the need for and use of rollers or spools over which the cord or tube must be drawn to avoid frictional wear on the cord or tube in repeated to and fro dragging inwardly and outwardly of the tube or cord to and from the retracted states.

Another object is to effect a retraction mechanism devoid of special spring mechanisms which typically are subject to the usual spring problems of wear and tear and lack of durability, as well as such spring mechanisms resulting in a constant negative pressure pulling on the instrument while the dentist is attempting to carefully use the same in a patient procedure, while window-shade type temporary intermittent locking devices against retraction until again pulled, are devices again subject to poor durability.

Another object is to obtain an equipment which avoids the mingling of retracted cords or lines or tubes of one mechanized instrument with that of another, while concurrently avoiding the above-noted problems and achieving the above-noted objects. In particular, also, whereas in some equipments, there are individualized compartments separate from one-another for the respective withdrawn plurality of cords, tubes or the like, such construction adds to the cost and to the cumbersome and unsightly understructure of such equipment.

Another object is to make possible the automatic tilting and/or slanting of the tray or equipment as the cord or tube is being drawn to an extended state in a particular direction irrespective of the dentist's position or angle of working, and to concurrently preferably also concurrently obtain preceding objects.

Another object is to obtain an engaging mechanism whereby the cord or tube may be locked automatically into an extended state and which by minor effort may be released by a simple and inexpensive mechanism, while avoiding problems of the type discussed above.

Other objects become apparent from the preceding and following disclosure.

One or more objects of the present invention are obtained by the invention as defined herein.

Broadly the invention may be defined as a support tray for bearing the weight of a distal end portion of the several connector tubes leading to their respective mechanized dental instruments, divided into several parallel upper-surface grooves in which the tubes are seated typically one tube per groove, with the connector tube extending through a narrowed forward groove constriction and out of a widened open end to the groove to connect with the instrument mounted thereon. There is an abrupt step at the open end against which the instrument body with a projection thereof is engageable against further retraction of the tube. Mounted on the connector tube is an outer casing in the nature of projection(s) which have a greater width or diameter than the constriction such that when the connector tube is pulled forwardly the outer casing rides above the constriction, and a forward end of the outer casing having a projection which becomes engaged with the step as the forward end of the connector tube angles downwardly from the point above the constriction toward the step. A mere flip of the wrist of the dentist, carrying the instrument in his hand, results in a disengagement, such that the weight of the tube rearward of the grooved tray causes the connector tube to become slid rearwardly in its groove upon disengagement of its projection with the step. In a preferred embodiment, the plurality of projections along the outer casing is in the form of a spiral ridge which accomplishes several object. In particular, the spiral preferably metal ridges of the outer casing facilitate the ease of sliding the connector tube along its longitudinal axis between extended and retracted states, while also adding weight to the tubular cover thereby facilitating the weighted retraction of the connector tube, and also the rigidity of the semi-flexible spiral-ridged outer cover tube serving to prevent a twisting of the tube to become self-entangled and to prevent the entanglement of adjacent connector tubes. The outer casing has an inner diameter slightly less than the outer diameter of the connector tube or line on which it is mounted such that there is a relatively snug fit but such that the outer casing may be slipped along the longitudinal axis of the connector tube to adjust the amount of connector tube extending beyond the forward end of the outer casing when the projection of the forward end of the outer casing is engaged with the step structure, this making it possible for any dentist to adjust the free amount of connector tube between the mechanized dental instrument that he working with, at the engaged outer casing. It should be understood that typically the outer casing may be slid only by exerting a force thereon, the outer casing normally retaining a relatively fixed position on the connector tube by virtue of friction arising from the relatively snug fit of the outer casing. In order to further prevent the necessity of sharp twists and sharp angles of the connector tube from the point of engagement of the forward portion of the outer casing with the step, the support tray is mounted on a base structure which base structure provides for forward and rearward alternate tilting of the tray as well as a slanting of the tray laterally in one direction or the other, as well as permitting the tray to be drawn closer or further away from a working position. The tilting and slanting are brought about by having the support tray mounted relatively fixedly but movably adjustably on an upper end of a support shaft, pivotably as for example might be done by a mounting on a ball (sphere) or with a projection through an arced slot, with a securing lever that may be tightened such as by the turning thereof to screw-in more tightly to clamp at any predetermined and set position, and the upright shaft being mounted on typically a male member slidably mounted within a female member for to and fro horizontal movement between upper and lower bearing structures.

THE FIGURES

Figure 4:
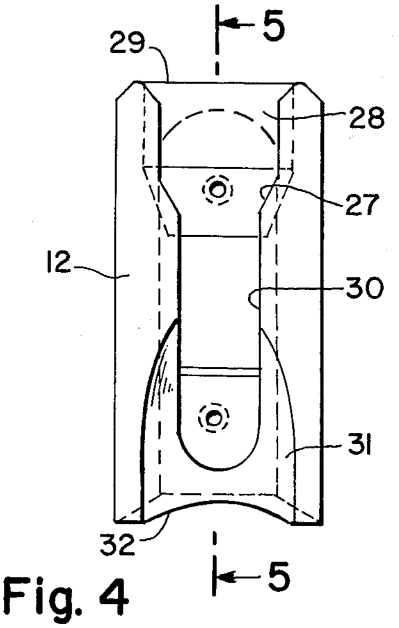
FIG. 4 illustrates an elevation plan view of a typical preferred embodiment of the constriction and engaging element normally located at a forward end of the groove structures of the support tray, illustrated in the absence of the connector tube.
Figure 5:
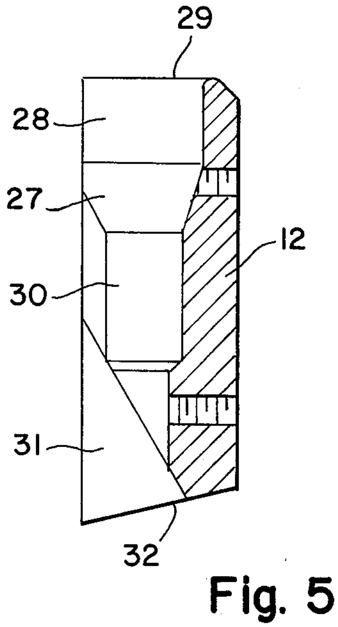
FIG. 5 illustrates a view of the structure of FIG. 4 as taken along line 5—5 in side cross-sectional view thereof.
Figure 6:
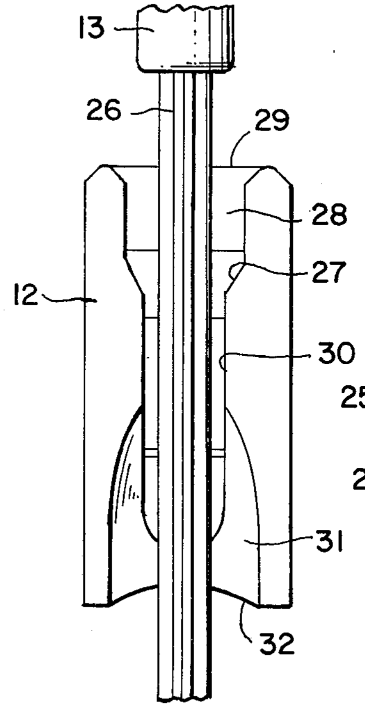
Figure 7:
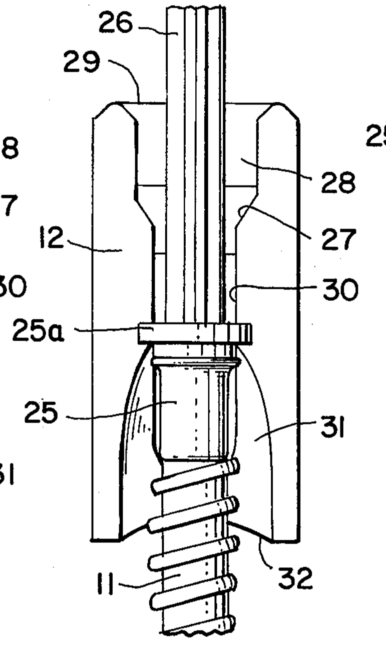
Figure 8:
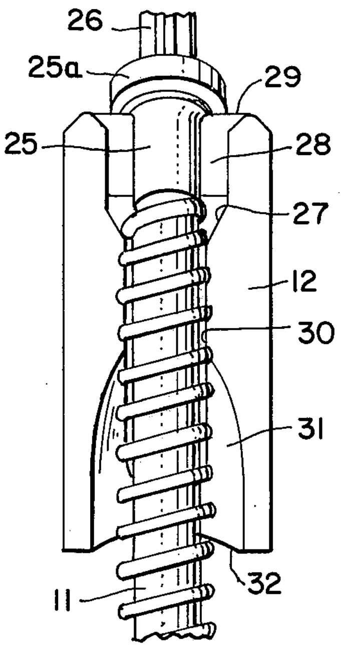

FIGS. 6, 7, and 8 illustrate the structure of FIGS. 4 and 5 showing in flow series the progressive diagrammatic positions of the mechanized tool or instrument in a state of being extended at a beginning stage in FIG. 6 as extension has just begun, and further extended in FIG. 7 before engagement of the outer casing projection with the step, and in a state of retaining engagement of the connector tube by the outer casing engagement with the step structure in FIG. 8, each of FIGS. 6, 7, and 8 being in part views in elevation plan view.

DETAILED DESCRIPTION OF THE INVENTION

Figure 1:
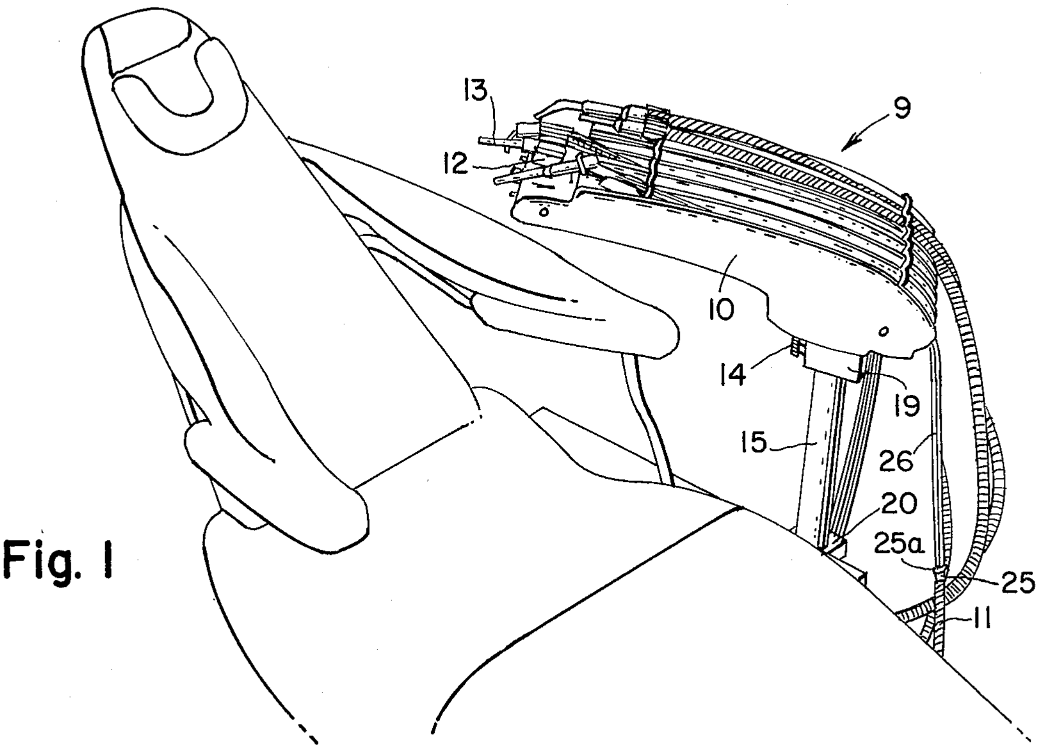
FIG. 1 illustrates an in-part view of a dental chair positioned beside a typical embodiment of the inventive improvement of the present invention in a preferred embodiment thereof, shown in perspective side view.

More particularly, FIG. 1 illustrates the inventive dental tray 9 of the present invention with the support tray 10 defining a plurality of parallel grooves in an upper face thereof having connector tubes (or lines) 26 mounted therein, one connector tube per groove (normally), with an outer spiral-ridged casing 11 mounted on each connector tube 26. On the forward end of each connector tube 26 there is mounted a mechanized dental instrument(or tool) 13, retained against a retaining element 12 fixedly mounted at a forward open end of a slot(groove). The clamping lever 14 secures the support tray 10 in a predetermined intermittently fixed state of tilt and slant on the support structure 19 mounted on support structure upright shaft 15 which is carried on base foot structure 20. The forward end of the outer casing is in the form of an engaging element 25 having an annular flange as an outwardly extending projection 25*a* for retaining engagement with the downwardly stepped(terminating ) structure 12.

Much of the structure related with regard to the FIG. 1 discussed above, is shown in greater detail in the remaining other Figures.

Figure 2:
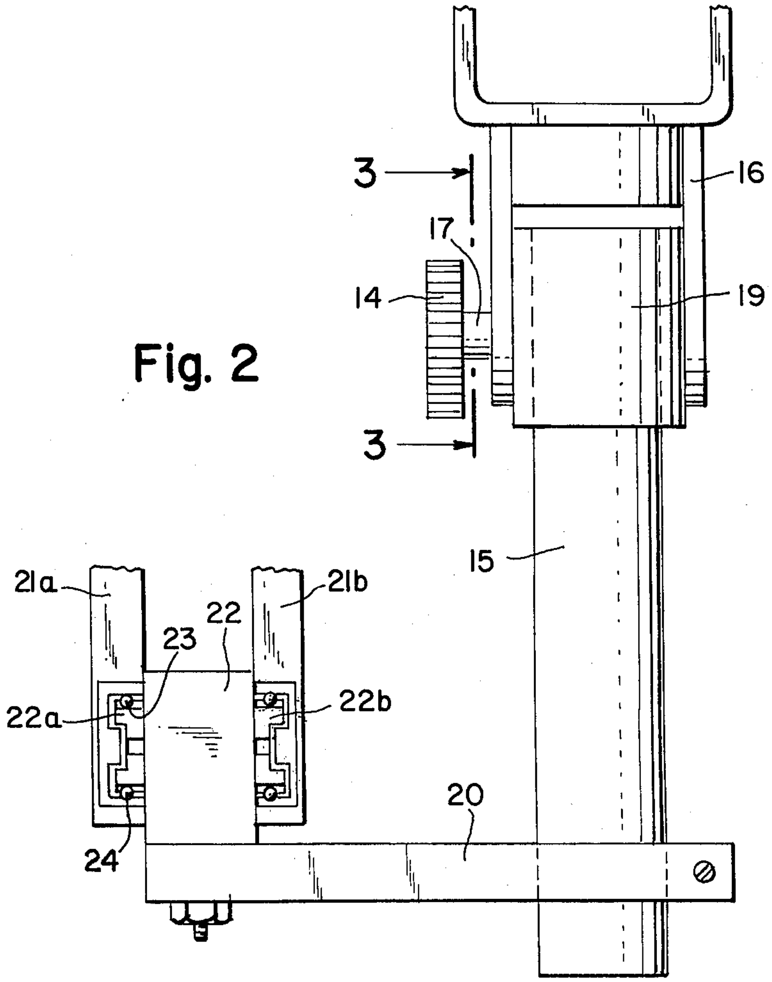
FIG. 2 illustrates an in-part side view of the base support structure with its upright shaft in elevation view thereof.

FIG. 2 illustrates a forward side view of the supporting structure of FIG. 1, in a part view thereof. Additionally there is shown in greater detail, the pivoted structure 16 mounted on the base structure 19, securable by the turning of the shaft 17 of handle lever 14. The base foot horizontal structure 20 includes male member 22 with horizontal flanges 22*a*, 22*b* mounted between upper bearings 23 and lower bearings 24 in female support structure 21*a* and 21*b*. Accordingly, the male member 22 is adjustable to and fro rollably on the bearings 23 and 24 within the female structure 21*a* and 21*b*.

Figure 3:
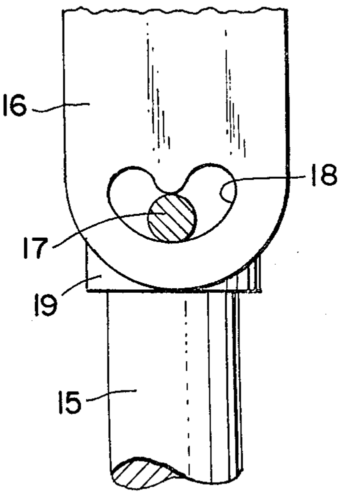
FIG. 3 illustrates a view of the structure of FIG. 2 as taken along the lines 3—3 thereof.

FIG. 3 further illustrates the structure of FIG. 2, showing in particular a cut-out space 18 in pivoted structure 16, allowing for slant of the support tray 10 in either of opposite lateral positions before the securing by the tightening of the shaft 17 by the turning of the hand lever 14.

FIG. 4 in elevation plan view and FIG. 5 in side cross-sectional view as taken along lines 5—5 of FIG. 4, each illustrates the retaining element located at a forward end of at least one of the grooves on the upper surface of the support tray 10 of FIG. 1. The rearward end of the engaging element 12 in this preferred embodiment is typically concave for alignment with the groove or slot structure, and the wall structure 31 of this proximal end, converges into the restricted constriction walls 30 of narrower dimensions than the outer diameter of the outer casing but of greater width in the constriction space than the diameter of the connector tube (or line) itself such that movement of the connector tube slidably along its longitudinal axis through the engaging element is not retarded in the sliding movement. At a forward end of the constriction are diverging walls 27 forming seating space 28 and the step structure 29 resulting from an abrupt termination of the structure at a forward end of the retaining engagement element 12.

The same structure is again illustrated in FIGS. 6 through 8, but in an operative state with the connector tube 26 mounted within the defined groove space of the retaining engaging element 12 as it would appear when the mechanized dental instrument 11 is being withdrawn from retaining engagement of the instrument against the diverging walls 27 and/or the step 29.

FIG. 7 illustrates the state of the annular flange projection 25*a* as it has moved forwardly along the narrowing walls 31 to overlie the constriction walls 30 as the connector tube 26 is being pulled forwardly further, as compared to the state of FIG. 6.

FIG. 8 illustrates a further state of being pulled forward, of the outer casing 11 after the casing is supported above the constriction walls 30 and according the forward end angled downwardly into the slot space 28 in a retained engaged state of the annular flange projection 25*a* being secured against the step structure 29 by virtue of the weight of the overall outer casing 11 extending a great distance rearwardly through the groove and hanging downwardly rearwardly therefrom behind the support tray 10. The weight of the downwardly hanging suspended portions of the outer casing serve to pull rearwardly the connector tube 26 thereby holding the annular flange projection 25*a* firmly against the step structure 29. A mere flip of the wrist of the dentist on the held dental mechanized instrument 13 serves to flip the annular flange projection 25 in an upwardly direction from its engagement with the step structure such that the entire outer casing 11 promptly slides rearwardly within its respective groove structure of the support tray 10.

The invention as disclosed includes obvious variations, modifications and substitution of equivalents as would be apparent to a person of ordinary skill in this art.

I claim:

1. A dental instrument tray device free of connector tube-mounted retraction wheel apparatus, comprising in combination: an elongated support tray having a substantially horizontally-extending elongated upper face thereof shaped to define a plurality of substantially parallel grooves in juxtaposition to one-another along said upper surface, with the grooves each terminating at a forward end thereof with an end structure defining forward open end, a rearward end of the respective grooves being also open, a substantially flexible tubular connector element adapted for mounting free of any retraction-pulley wheel structure and seated within at least one of the grooves, the tubular connector extending and hanging downwardly from a rear end of the groove in which it is seated, instrument means for connecting a dental instrument operatively to a forward end of the tubular connector element, and a connected dental instrument seated engagingly at the forward open end of the groove, said forward open end and said dental instrument being structured to prevent the dental instrument from slipping from the forward open end into the groove rearwardly thereof, and an engaging element mounted circumscribingly around the tubular connector element and having a retainer structure of a shape for retaining engagement with the forward open end groove structure such that when pulled past the forward open end the engaging element is retainably engagable with the retainer of the forward open end thereby preventing the tubular connector element from slipping axially rearwardly in the groove while the engaging element remains engaged with the retainer structure, the engaging element relative to the forward open end having structure adapted such that disengagement may be effected by predetermined movement of the engaging element relative to the open end, whereby the tubular connector is thereby slidable retractably, and the engaging element includes a tubular structure having a forward flange and having elongated structure rearwardly extending along that portion of the tubular connector that is hanging downwardly, thus adapted to provide a predetermined amount of mass sufficient for weight thereof to effect rearwardly sliding of the tubular connector element axially of the longitudinal axis of the tubular connector element when the tubular connector element is in a pulled-forward state and when concurrently the engaging element is in a state of disengagement from the open end's groove structure.

2. A dental instrument tray device of claim 1, in which said forward open end is defined by retaining structures comprising narrowing walls defining a narrowing slot to a predetermined slot width of dimensions less than a width of the engaging element and thereafter in continued forward direction defining a widened slot to a size greater than the size of the retaining element, and terminating in a step defining an opening of the forward open end with an abrupt termination of structure sufficiently for overhanging engagement therewith of the engaging element, the narrowed structure of the slot serving to cause a continuing portion of the engaging element to be resting above and substantially outside of slot space of the widened slot in juxtaposition to the opening, whereby a forward end portion of the engaging element is caused to angle downwardly facilitating retained engagement thereof with the step.

3. A dental instrument tray device of claim 2, in which said elongated structure includes laterally extending intermittent projections.

4. A dental instrument tray device of claim 3, in which said elongated structure and laterally extending intermittent projections thereof comprise a tube having a spiral ridge extending therealong.

5. A dental instrument device of claim 1, in which said elongated structure includes laterally extending intermittent projections.

6. A dental instrument tray device of claim 1, including base support structure means for providing pivotal support of the support tray for optional intermittent degrees of forward or rearward slant and tilt toward one side or the other to predetermined degrees.

7. A dental instrument tray device of claim 6, in which the base support means further provides for movement of the support tray substantially horizontally forwardly or backwardly optionally predetermined distances intermittently.

8. A dental instrument tray device of claim 1, including base support means for movement of the support tray substantially horizontally forwardly or backwardly optionally predetermined distances intermittently, the base support means including a male portion defining laterally horizontally extending flanges and a female portion with upper and lower bearing means for seating the male portion's flanges within the female portion; the flanges being seated for lateral movement on said upper and lower bearing means within the female portion, for said movement forwardly or backwardly.

* * * * *